(12) United States Patent
Clark

(10) Patent No.: US 6,400,276 B1
(45) Date of Patent: Jun. 4, 2002

(54) SELF-SERVICE TERMINAL

(75) Inventor: Barrie Clark, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/589,696

(22) Filed: Jun. 8, 2000

(30) Foreign Application Priority Data

Jun. 29, 1999 (GB) .............................................. 9915189

(51) Int. Cl.[7] .............................................. G08B 21/00
(52) U.S. Cl. .................... 340/640; 340/541; 340/568.1; 348/143; 348/152; 382/203; 706/933
(58) Field of Search .............................. 340/540, 568.1, 340/5.61, 573.4, 541, 5.1; 706/933; 348/152; 2614/143; 2613/149, 700; 382/195, 201, 203, 115, 116, 118, 124

(56) References Cited

U.S. PATENT DOCUMENTS

| | | | | |
|---|---|---|---|---|
| 4,785,171 A | * | 11/1988 | Dowling, Jr. et al. ....... | 250/227 |
| 4,975,969 A | * | 12/1990 | Tal .............................. | 382/116 |
| 4,993,068 A | * | 2/1991 | Piosenka et al. ............ | 713/186 |
| 5,073,950 A | * | 12/1991 | Colbert et al. .............. | 382/115 |
| 5,831,669 A | * | 11/1998 | Adrain ........................ | 348/143 |
| 5,862,247 A | * | 1/1999 | Fisun et al. ................. | 382/116 |
| 6,028,626 A | * | 2/2000 | Aviv ........................... | 348/152 |

* cited by examiner

*Primary Examiner*—Edward Lefkowitz
*Assistant Examiner*—Davetta W. Goins
(74) *Attorney, Agent, or Firm*—Francis L. Conte

(57) ABSTRACT

A monitoring system for use with a self-service terminal (25) having a user interface is described. The system comprises: image capture means (30) for capturing images of at least part of the user interface; image storage means (34) for storing at least one image captured by the image capture means (30); image processing means (32) for comparing the at least one stored image with a subsequently captured image of the part of the user interface so as to detect the addition of an alien device to the part of the user interface; and alarm means (38) for generating an alarm signal if the image processing means (32) detects the addition of an alien device.

29 Claims, 1 Drawing Sheet

SELF-SERVICE TERMINAL

BACKGROUND OF THE INVENTION

The present invention relates primarily to self service terminals (SSTs), such as automatic teller machines (ATMs), and in particular to a system for detecting fraudulent activity in relation to an SST.

SSTs, such as automated teller machines (ATMs), are commonly and increasingly used to carry out many everyday transactions which do not require human supervision. In the case of ATMs, one of the most frequently executed transactions is the withdrawal of cash from bank accounts, although other transactions may involve electronic transfer of funds between accounts, bill payments, or simply obtaining an indication of an account balance or a 'mini-statement' providing details of recent transactions.

Conventional ATMs incorporate one or more customer interfaces via which a customer (i.e. a user) confirms their identity, for example, a card reader slot in the ATM into which the customer inserts a magnetic stripe card, and/or a key pad by means of which a customer confirms their identity by, for example, entering a personal identification number (PIN) associated with the magnetic stripe card, but known only to the user. Self service terminals are capable of being compromised by the addition of 'alien' devices, which are introduced to the customer interface of the terminal. These devices, which are typically used to capture normally secure data such as account details and customer PINs, are usually carefully sculpted onto the surface of the terminal, and may be extremely difficult to detect by the untrained eye. In some instances, the 'alien' device may be introduced into one or more of various customer interface 'apertures' of the terminal e.g. card reader, depository, or dispenser slots, to physically restrain items of value which are then subsequently recovered by the would-be fraudster who may then use them to conduct fraudulent activity.

SUMMARY OF THE INVENTION

It is an object of the present invention to provide a system that reduces the risk of one or more of the aforementioned fraudulent activities occurring.

According to a first aspect of the present invention, there is provided a monitoring system for use with a self-service terminal (SST) having a user interface, the system comprising; image capture means for capturing images of at least part of the user interface; image storage means for storing at least one image captured by the image capture means; image processing means for comparing the at least one stored image with a subsequently captured image of the part of the user interface so as to detect the addition of an alien device to the part of the user interface; and alarm means for generating an alarm signal if the image processing means detects the addition of an alien device.

One advantage of the invention is that changes in the appearance of the fascia of the SST due to the addition of one or more alien devices can be detected using the system. The system can be configured so that any attempt by a fraudster to obscure the image capturing means, in order to prevent an image of the SST from being captured, will be detected by the system.

By using a suitable image capture means the system may be able to monitor the entire user interface. If the entire user interface is monitored, the addition of any alien devices placed either on top of or along side any user interface element (e.g. a key pad, a card entry/exit slot, or such like) can be detected. As well as being capable of detecting alien devices on the surface of the SST the system can also be used to detect unusual patterns of activity associated with the introduction of alien devices to the SST, as will later be described in more detail.

The image capture means may comprise one or more cameras, for example in the form of a solid state imaging device which may be mounted in the SST at a suitable position for capturing an image of one or more parts of the user interface of the SST. Alternatively, or additionally, the image capture means may incorporate optical fibers embedded in the SST.

The image capture means may additionally include further optical elements such as one or more prisms, lenses or the like for capturing an image of the one or more parts of the user interface that is conveyed by the optical fibers to the image processing means and/or the image storage means.

The image storage means preferably stores one or more images captured by the image capture means as digital data files. The image processing means is preferably in the form of a micro-processor that is programmed to subtract a stored image from a subsequently captured image received from the image capture means, and to process the resultant image to detect differences between the stored image and the subsequently captured image due to the addition of one or more alien devices to part of the user interface of the SST.

In the preferred embodiment, a series of 'passive' images of the SST, captured by the image capture means, are stored in the image storage means, each image having been captured during different lighting conditions. The image processing means preferably compares a subsequently captured 'live' image with each of the stored images. The image processing means may be programmed to control activation of the alarm means so that an alarm signal is only generated when the image processing means detects the addition of an alien device with respect to more than a predetermined minimum number of the stored images. This minimizes false alarms due to different lighting conditions in the SST surrounding environment.

It will be appreciated that a captured image to be compared with one or more of the stored images may also be stored, at least temporarily, in the image storage means.

The image processing means may be programmed to perform time averaging of images captured by the image capture means for preventing legitimate use of the SST from triggering an alarm system. For example, the image processing means may be programmed to store a number of images captured by the image capture means over a predetermined period of time, in the image storage means, and to carry out a time averaging process of these stored images prior to subtracting one of the previously stored 'passive' images therefrom.

In a more sophisticated implementation of the invention the image processing means is further configured to analyze 'traffic patterns', at one or more user interface apertures (e.g. a card slot or a bank note dispenser slot) of the SST to determine if unusual activity is occurring, for example a fraudster's attempts to introduce an alien device in the aperture. The term 'traffic pattern' as used herein refers to the areas of the user interface that a user's hands and arms cover during a typical transaction, and to the time periods that these areas are typically covered for during a transaction. Any traffic pattern that deviates substantially from a typical traffic pattern may be a result of a fraudulent user attempting to locate an alien device on the SST.

The image processing means may be programmed with suitable algorithms for processing images captured by the image capture means over a period of time to determine if such unusual activity is occurring. These algorithms may utilize feedback from the above-described 'basic' implementation of the invention in which one or more stored 'passive' images are subtracted from the subsequently captured image (s), to further refine the detection of alien devices and further reduce the chance of an alarm signal being produced during legitimate use of the SST.

The image capture means may operate in the visible part of the spectrum, but may alternatively or additionally capture images outside the visible spectrum. For example, infra-red or ultra-violet images may be captured and processed for detecting the addition of alien devices.

The alarm signal produced by the alarm means is preferably relayed to an alarm unit for generating an audible alarm and/or a visual alarm remote from the ATM. The alarm unit may be located in a control center that monitors the operation of a one or more ATMs. In some units, the alarm unit may be located within, or local to, the ATM.

According to another aspect of the invention, there is provided a self-service terminal (SST) incorporating a monitoring system as above described.

According to a yet further aspect of the invention, there is provided a method of detecting the addition of an 'alien' device to a self-service terminal (SST), the method comprising the steps of: capturing images of at least part of a user interface of an SST; storing at least one captured image; processing the at least one stored image and a subsequently captured image so as to compare the two images for detecting the addition of an alien device to the at least part of a user interface; and producing an alarm signal when the addition of an alien device is so detected.

BRIEF DESCRIPTION OF THE DRAWINGS

Preferred embodiments of the invention will now be described by way of example only and with reference to the accompanying drawings in which.

DETAILED DESCRIPTION

Figure 1:
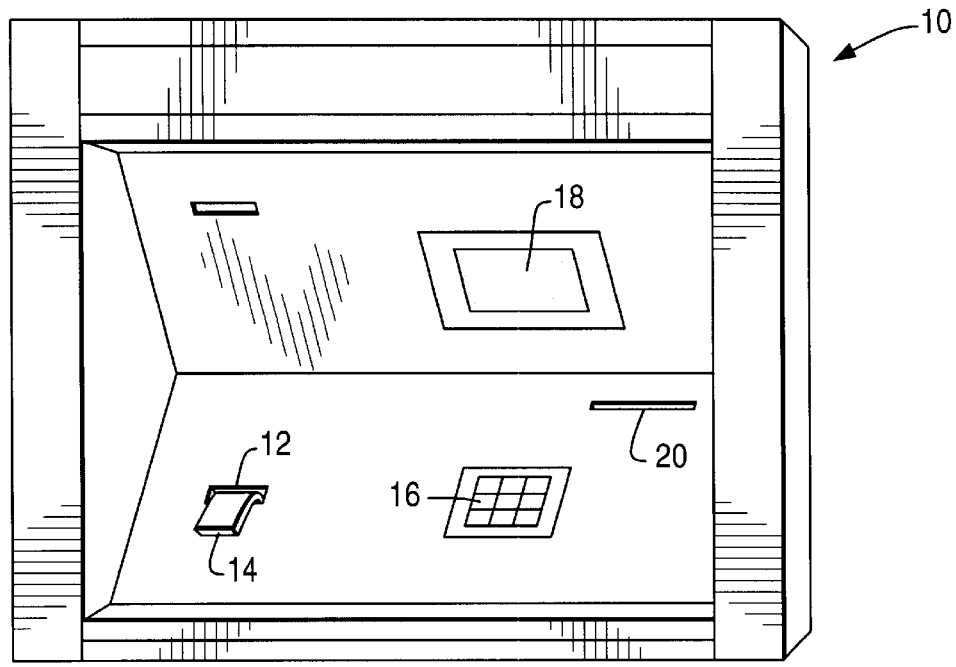
FIG. 1 is a perspective view of the fascia of a conventional ATM.

FIG. 1 shows the fascia of a conventional automated teller machine (ATM). The ATM 10 comprises a number of elements for interacting with a user, including a magnetic card reader slot 12, where the user inserts an identification card 14; an encrypting keypad 16 where the user may enter a PIN or other data; a screen 18, on which the ATM displays messages for the user; and a cash dispensing slot 20 for delivering bank notes or other valuable media to the user.

Figure 2:
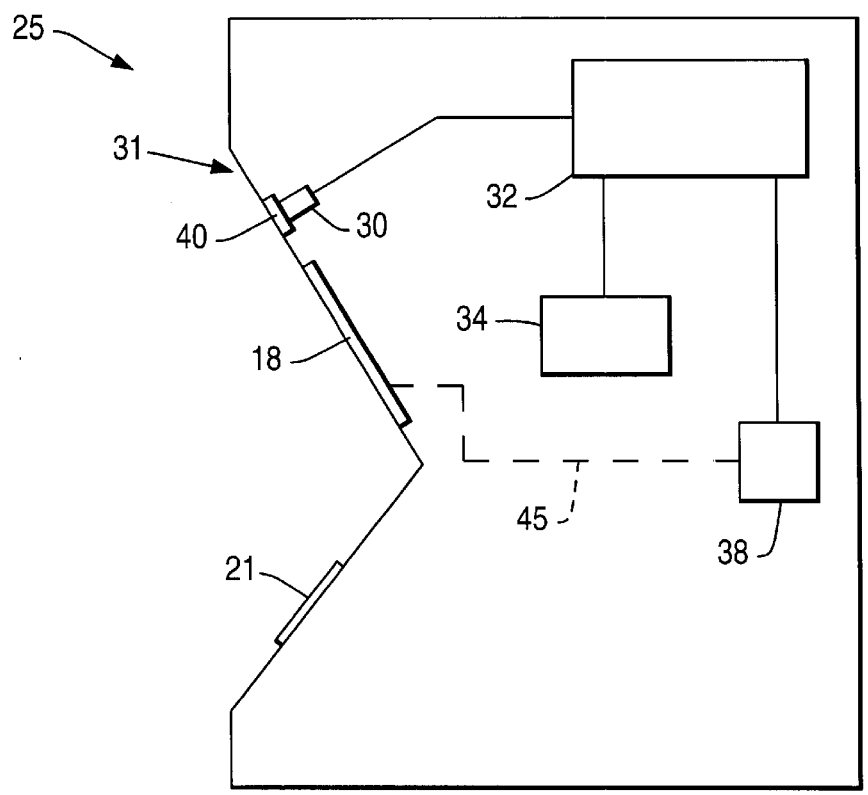
FIG. 2 is a schematic cross-section of a fascia of an ATM incorporating a monitoring system according to the invention.

If an attempted fraud as described above is to be perpetrated, a false keypad 21 (as shown in FIG. 2) may for example be placed over the keypad 16, and connected to a monitoring device (not shown). When a user inserts his card 14 into the slot 12, the ATM 10 displays a message on the screen 18, prompting the user to enter his PIN on the keypad 16. The user then enters his PIN, via the false keypad 21 which records the PIN. After the transaction has been completed, an unauthorized individual may download the PIN from the false keypad 21. If an accomplice successfully obtains possession of the user's card 14, the PIN and card may then be used to withdraw funds from the user's bank account.

FIG. 2 shows a monitoring system for monitoring the fascia of the ATM 25 for detecting the addition of an alien device, such as the false keypad, to the ATM fascia. The system comprises an image capture means 30 in the form of a small digital camera for imaging at least the portion of the fascia of the ATM that contains the keypad 16 (FIG. 1). The camera 30 is discretely mounted in the ATM, for example in a wall 31 of the ATM fascia protruding over the keypad 16, there being a small window 40 provided in this wall 31 through which the camera 30 receives the image of the keypad 16. The digital camera 30 is connected to a digital image processing means in the form of a micro-processor 32 which receives images captured by the camera 30. The micro-processor 32 is programmed to store one or more of the images received from the camera 30 in an image data store in the form of a framestore or other memory 34 connected to the micro-processor 32, for storing digital image data. The micro-processor 32 is programmed to process an incoming image from the camera 30 so as to subtract therefrom a previously captured image already stored in the memory 34, so as to compare the two images. Differences in the two images may indicate the presence of an alien device and/or unusual activity occurring at the SST during introduction of the alien device by a fraudster. The micro-processor 32 is preferably programmed to analyze the resultant image obtained following subtraction of a stored image from a subsequently captured image and to detect the addition of an alien device when a predetermined level of differences are present between the compared images. An electronic alarm 38 is connected to the micro-processor 32 for activation by the micro-processor 32 so as to produce an audible alarm when the addition of an alien device to the keypad 16, or in the vicinity thereof, appearing in the image captured by the camera 30, is detected by the microprocessor 32.

In practice, a series of 'passive' images are stored in the memory, associated with various lighting conditions of the ATM, and the micro-processor stores temporarily a further subsequently captured image in the memory 34 and then subtracts each of the previously stored passive images therefrom, and analyses and/or averages the resultant images obtained following the subtractions for detecting a predetermined level or pattern of differences indicative of the addition of one or more alien devices. The micro-processor 32 may carry out time averaging during the capture of images and/or in relation to the subtraction operations to allow for legitimate use of the ATM and to reduce the chances of such legitimate use triggering an alarm condition.

The micro-processor is also programmed to analyze 'traffic patterns' i.e. activity occurring at the ATM over predetermined periods of time, to determine if unusual activity is occurring which may be associated with a fraudster introducing one or more alien devices at the ATM. The micro-processor uses software algorithms (which may be stored in the memory 34, or further memory associated with the micro-processor) that utilize feedback from earlier captured images and/or subtractions of various images, so as to analyze more recently captured images, for building up a picture of traffic patterns at the ATM over a period of time, and for determining whether or not the alarm should be activated.

It will be appreciated that an alien device can be detected even if it is placed alongside or on top of a user interface element. It will also be appreciated that one or more optical surveillance devices are used to determine if the fascia of an SST has been compromised by the introduction of a surface or a sub-surface mounted 'alien' device.

Various modifications may be made to the above described embodiments. For example, in a modified embodiment, the alarm 38 may be configured to also display a visual alarm signal on the ATM screen 18 when the addition of an alien device is detected (as indicated by the broken line between the alarm 38 and screen 18 in FIG. 2). In another embodiment, the ATM may be removed from service on detecting an alien device.

It will appreciated that other types of image capture device arc possible such as optical fibers embedded in the ATM with associated optical elements for capturing an image and conveying it in the optical fibers to the microprocessor 32. Where the captured image is not already in digital form the system would further include analogue to digital converter means for digitizing the image prior to storing the image in the memory and/or processing the image.

If an appropriate observation point cannot be established to cover the zone of interest on the fascia of the ATM a plurality of image capture devices positioned at different locations may be used, the microprocessor 32 being arranged to receive captured images from each image capture device. It will be appreciated that all the components of the monitoring system are built into the ATM so that they are substantially invisible to a user or fraudster and cannot be tampered with.

What is claimed is:

1. A monitoring system for use with a self-service terminal having a user interface, the system comprising:
   image capture means for capturing images of at least part of the user interface;
   image storage means for storing at least one of said interface images captured by the image capture means;
   image processing means for comparing the at least one stored interface image with a subsequently captured image of the part of the user interface so as to detect the addition of an alien device to the part of the user interface; and
   alarm means for generating an alarm signal if the image processing means detects the addition of an alien device.

2. A monitoring system according to claim 1, wherein the image capture means comprises one or more digital cameras.

3. A monitoring system according to claim 1, wherein the image capture means incorporates one or more optical fibers embedded in the self-service terminal.

4. A monitoring system according to claim 1, wherein the image processing means is programmed to subtract a stored image from a subsequently captured image received from the image capture means, and to process the resultant image to detect differences between the stored image and the subsequently captured image due to the addition of one or more alien devices to part of the user interface of the self-service terminal.

5. A monitoring system according to claim 1, wherein the image processing means is programmed to control activation of the alarm means so that an alarm signal is only generated when the image processing means detects the addition of an alien device with respect to more than a predetermined minimum number of the stored images.

6. A monitoring system according to claim 1, wherein the image processing means is programmed to perform time averaging of images captured by the image capture means for preventing legitimate use of the self-service terminal from triggering an alarm.

7. A monitoring system according to claim 1, wherein the image processing means is configured to analyze traffic patterns at one or more user interface apertures of the self-service terminal to determine if unusual activity is occurring.

8. A monitoring system according to claim 1, wherein the alarm signal produced by the alarm means is relayed to an alarm unit for generating an audible alarm remote from the self-service terminal.

9. A monitoring system for use with a self-service terminal having a user interface, the system comprising:
   a camera for capturing images of part of the user interface;
   a memory for storing at least one of said interface images captured by the camera;
   a processor for comparing the at least one stored interface image with a subsequently captured image of the part of the user interface to determine if an alien device has been added to the part of the user interface; and
   an alarm device for generating an alarm signal when the processor determines that an alien device has been added to the user interface.

10. A monitoring system according to claim 9, wherein the camera comprises one or more digital cameras.

11. A monitoring system according to claim 9, wherein the camera incorporates one or more optical fibers embedded in the self-service terminal.

12. A monitoring system according to claim 9, wherein the processor is programmed to subtract a stored image from a subsequently captured image received from the camera, and to process the resultant image to detect differences between the stored image and the subsequently captured image due to the addition of an alien device to the part of the user interface of the self-service terminal.

13. A monitoring system according to claim 9, wherein the processor is programmed to control activation of the alarm device to generate the alarm signal only when the processor determines that an alien device has been added to the part of the user interface with respect to more than a predetermined minimum number of the stored images.

14. A monitoring system according to claim 9, wherein the processor is programmed to perform time averaging of images captured by the camera for preventing legitimate use of the self-service terminal from activating the alarm device.

15. A monitoring system according to claim 9, wherein the processor is configured to analyze traffic patterns at one or more user interface apertures of the self-service terminal to determine if unusual activity is occurring.

16. A monitoring system according to claim 9, wherein the alarm signal produced by the alarm device is relayed to an alarm unit for generating an audible alarm remote from the self-service terminal.

17. A self-service terminal comprising:
   a user interface;
   a camera for capturing images of part of the user interface;
   a memory for storing at least one of said interface images captured by the camera;
   a processor for comparing the at least one stored interface image with a subsequently captured image of the part of the user interface to determine if an alien device has been added to the part of the user interface; and
   an alarm device for generating an alarm signal when the processor determines that an alien device has been added to the user interface.

18. A self-service terminal according to claim 17, wherein the camera comprises one or more digital cameras.

19. A self-service terminal according to claim 17, wherein the processor is programmed to subtract a stored image from a subsequently captured image received from the camera, and to process the resultant image to detect differences between the stored image and the subsequently captured image due to the addition of an alien device to the part of the user interface.

20. A self-service terminal according to claim 17, wherein the processor is programmed to control activation of the alarm device to generate the alarm signal only when the processor determines that an alien device has been added to the part of the user interface with respect to more than a predetermined minimum number of the stored images.

21. A self-service terminal according to claim 17, wherein the processor is programmed to perform time averaging of images captured by the camera for preventing legitimate use of the self-service terminal from activating the alarm device.

22. A self-service terminal according to claim 17, wherein the processor is configured to analyze traffic patterns at one or more user interface apertures of the self-service terminal to determine if unusual activity is occurring.

23. A self-service terminal according to claim 17, wherein the alarm signal produced by the alarm device is relayed to an alarm unit for generating an audible alarm remote from the self-service terminal.

24. A method of detecting the addition of an alien device to a user interface of a self-service terminal, the method comprising:

(a) capturing images of at least part of the user interface;

(b) storing at least one captured interface image;

(c) comparing the at least one stored interface image with a subsequently captured image of said interface part to detect the addition of an alien device to the at least part of the user interface; and (d) producing an alarm signal when the addition of an alien device to the at least part of the user interface is detected.

25. A method according to claim 24, wherein step (c) includes the step of:

(c-1) subtracting a stored image from a subsequently captured image; and (c-2) processing the resultant image to detect differences between the stored image and the subsequently captured image due to the addition of an alien device to the at least part of the user interface of the self-service terminal.

26. A method according to claim 24, wherein step (d) includes the step of:

(d-1) producing the alarm signal only when the addition of an alien device to the at least part of the user interface is detected with respect to more than a predetermined minimum number of the stored images.

27. A method according to claim 24, further comprising the step of:

(e) performing time averaging of captured images for preventing legitimate use of the self-service terminal from producing an alarm signal.

28. A method according to claim 24, further comprising the step of:

(e) analyzing traffic patterns at one or more user interface apertures of the self-service terminal to determine if unusual activity is occurring.

29. A method according to claim 24, further comprising the step of:

(e) relaying the alarm signal to an alarm unit for generating an audible alarm remote from the self-service terminal.

* * * * *